(12) United States Patent
Warren et al.

(10) Patent No.: US 7,451,180 B2
(45) Date of Patent: *Nov. 11, 2008

(54) SYSTEM AND METHOD FOR USING PACKED COMPRESSED BUFFERS FOR IMPROVED CLIENT SERVER COMMUNICATIONS

(75) Inventors: Joseph R. Warren, Renton, WA (US); Karl Froelich, Shoreline, WA (US); Nicole A. Bonilla, Redmond, WA (US); Remi A. Lemarchand, Redmond, WA (US); Ronald E. Gray, Redmond, WA (US); Alec Dun, Redmond, WA (US); Aaron Hartwell, Duvall, WA (US); Steven F. Goddard, Seattle, WA (US); Brent Curtis, Seattle, WA (US); Brendan Power, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/462,310

(22) Filed: Aug. 3, 2006

(65) Prior Publication Data

US 2006/0265510 A1 Nov. 23, 2006

Related U.S. Application Data

(63) Continuation of application No. 10/442,380, filed on May 21, 2003, now Pat. No. 7,111,039.

(60) Provisional application No. 60/428,153, filed on Nov. 20, 2002.

(51) Int. Cl.
*G06F 15/16* (2006.01)

(52) U.S. Cl. .................. 709/203; 709/206; 709/247

(58) Field of Classification Search .................. 709/203, 709/230, 247, 206
See application file for complete search history.

(56) References Cited

U.S. PATENT DOCUMENTS 5,537,551 A 7/1996 Denenberg et al.

(Continued)

FOREIGN PATENT DOCUMENTS

CA 2329891 A1 6/2002

(Continued)

OTHER PUBLICATIONS

Bisdikian, C., Performance Analysis of Single-Stage, Output Buffer Packet Switches with Independent Batch Arrivals, Computer Networks and ISDN Systems, vol. 27, No. 5, pp. 627-652, Mar. 1995.

(Continued)

*Primary Examiner*—Frantz B Jean
(74) *Attorney, Agent, or Firm*—Senninger Powers LLP

(57) ABSTRACT

A method of batching multiple sets of responses on a server and sending the responses to a client in a single batch (i.e., a "chained" or "packed" batch). The sets of responses may be each be obfuscated and/or compressed. Once the batch is received by the client, each set is processed individually. The client may be configured to communicate the size of an uncompressed set of responses that it can handle. The server may use this information to create sets of responses that are the correct size, and may or may not compress the sets of responses. The server may chain the sets of responses and may continue to chain sets, compressed or not, until the server's buffer is full or close to full. The chained set of responses may then be sent to the client, and may process each of the sets of responses individually.

19 Claims, 10 Drawing Sheets

U.S. PATENT DOCUMENTS

| | | | |
|---|---|---|---|
| 6,073,137 | A | 6/2000 | Brown et al. |
| 6,324,544 | B1 | 11/2001 | Alam et al. |
| 6,385,672 | B1 | 5/2002 | Wang et al. |
| 6,529,685 | B2 | 3/2003 | Ottesen et al. |
| 2002/0184224 | A1 | 12/2002 | Haff et al. |

FOREIGN PATENT DOCUMENTS

| | | | |
|---|---|---|---|
| EP | 0981231 A1 | | 2/2003 |
| EP | 1291770 A2 | | 3/2003 |
| EP | 1631025 A3 | | 5/2006 |
| WO | 94/13086 A1 | | 6/1994 |
| WO | WO 9413086 | * | 6/1994 |
| WO | 00/57612 A | | 9/2000 |
| WO | 0127774 A1 | | 4/2001 |
| WO | 01/78319 A2 | | 10/2001 |
| WO | 02/21749 A | | 3/2002 |
| WO | WO 0221749 | * | 3/2002 |
| WO | 02084520 A1 | | 10/2002 |

OTHER PUBLICATIONS

Crispin, M., Internet Message Access Protocol, Version 4, Rev. 1 pp. 1-71, Dec. 1996.

Myers, J., et al., Post Office Protocol, Version 3, pp. 1-23, May 1996.

Satyanarayanan, et al., Eds., in the RPC2 Reference Guide and Manual, Chapter 4, RPC2 Runtime System, pp. 37-62, Carnegie Mellon University, Pittsburgh, PA, May 2002.

Nieplocha et al., ARMCI: A Portable Remote Copy Library for Distributed Array Libraries and Compiler Run-Time Systems, Apr. 12-16, 1999, pp. 533-546.

\* cited by examiner

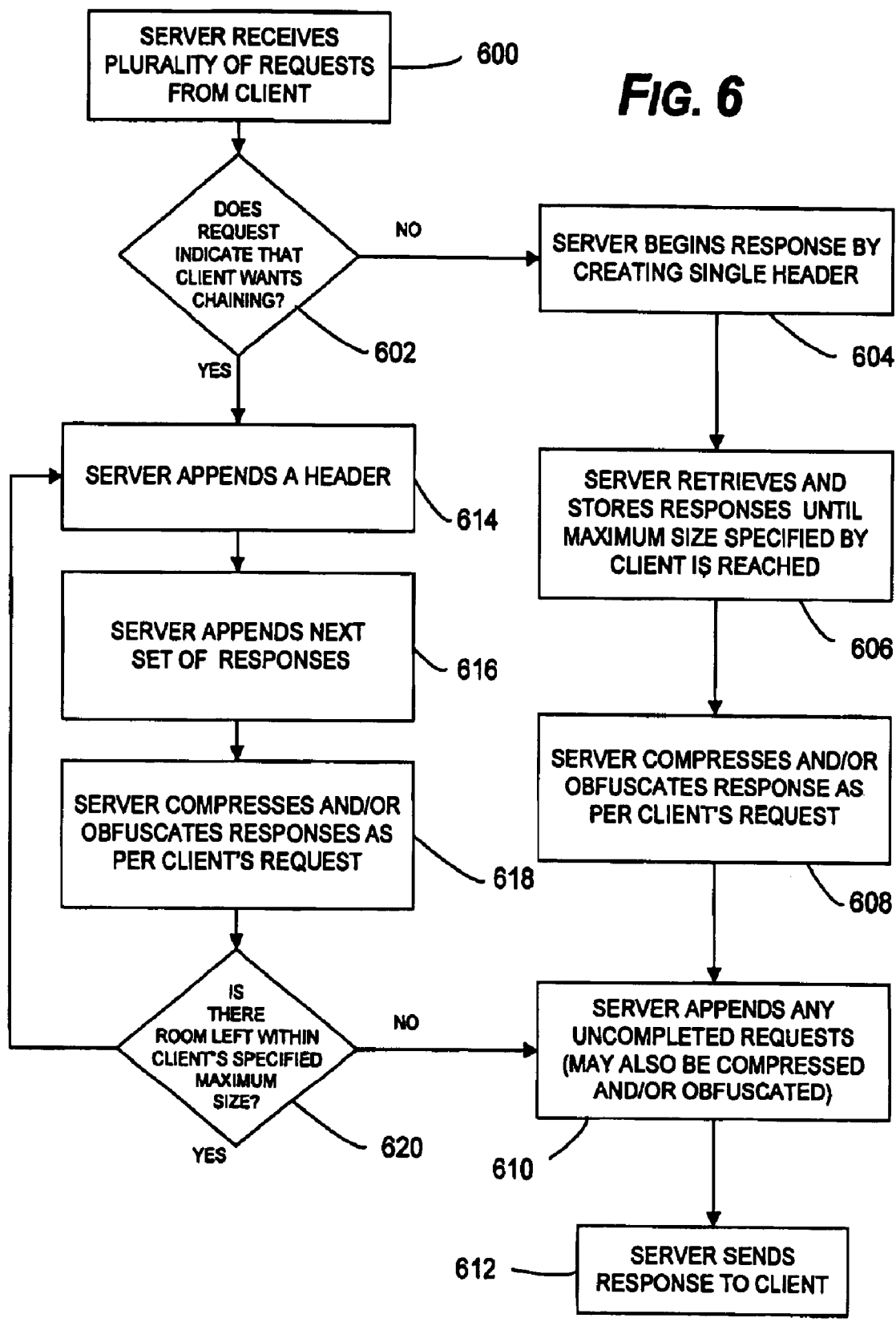

SYSTEM AND METHOD FOR USING PACKED COMPRESSED BUFFERS FOR IMPROVED CLIENT SERVER COMMUNICATIONS

REFERENCE TO RELATED APPLICATION

This application claims the benefit of the filing date of U.S. Non-provisional application Ser. No. 10/442,380, entitled "SYSTEM AND METHOD FOR USING PACKED COMPRESSED BUFFERS FOR IMPROVED CLIENT SERVER COMMUNICATIONS," filed May 21, 2003, which claims the benefit of the filing date of U.S. provisional application Ser. No. 60/428 153, filed Nov. 20, 2002, and incorporated herein by reference.

TECHNICAL FIELD OF THE INVENTION

This invention generally relates to computer networks, and more particularly, to methods for communicating between client and server applications such as email applications.

BACKGROUND OF THE INVENTION

Email has become an important method for communicating. Email systems typically include a server component (e.g., Microsoft Exchange Server) and a client component (e.g., Microsoft Outlook or Microsoft Outlook Express). These components are typically software applications that are configured to execute on computing devices (e.g., servers, PCs, laptops, and PDAs).

Some types of email servers are configured to allow email to be accessed via an Internet browser client (e.g., Microsoft Internet Explorer) rather than a dedicated email client. In these systems, the browser interacts with the email server, and any functions required to be performed on the client system are performed through the browser (e.g., by downloading Javascript) or through the use of Active Server Pages.

Since clients and servers are often connected by networks that have low bandwidth and high latency (e.g., slow dial-up connections), many email clients and servers are configured to store pending instructions and then send several instructions together. For example, instead of sending an open folder command and sending an open calendar command, a client may store the first instruction and combine it with second instruction and then send the two instructions together. This store, combine, and send scheme tends to allow a more efficient use of network and server resources, since there is some overhead associated with each transmission.

Some prior art systems have relied on a single buffer allocated at each of the client and at the server to act as a data store area for instructions and/or data that are waiting to be sent together. In one example of such a system, the client uses a buffer to store instructions and data that are to be sent to the server. Once the buffer is full or close to being full, the client sends the contents of the buffer to the server. The server stores the received contents into a buffer and begins parsing and executing the instructions. A pointer may be used to designate the next request to be serviced.

The server assembles its responses in its buffer, and ensures that the contents of its buffer do not exceed the size of a client buffer. If the server is unable to complete any requests in its buffer (e.g., because there is not enough room in the buffer), the server writes the uncompleted requests into the buffer and sends them back to the client with the completed responses.

In some systems, the client may be configured to specify how much memory the client is willing to allocate to its buffer. For example, the client may indicate to the server that only 32 KB will be devoted to its buffer. In response, the server will ensure that it does not send the client more than 32 KB at one time.

Given the low bandwidth and high latency nature of the connections used between many email clients and servers, a system and method for improving performance is needed.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

A method for requesting responses is disclosed. In one embodiment, the method is optimized for use between an email client and an email server. The method may include allocating a first buffer on a client, and then using the buffer to assemble one or more requests to a server. The client may also be configured to append a header to the contents of the first buffer, and the header may be configured to include an indicator as to whether or not the response to the requests by the server are to be compressed before they are returned to the client.

Another option for the server may be to obfuscate or encrypt the requests before they are sent to the client. Corresponding indicator bits for these features may also be included in the header.

In some implementations, the client may be configured to utilize RPCs (Remote Procedure Calls) to implement the requests. In some of these implementations, the header may be a fixed length remote procedure call header. In some embodiments, the header may further include an indicator as to the uncompressed size of a set of responses that the client is configured to process.

A method for transferring data from a server to a client is also disclosed. The method may include receiving a batch of requests from a client, wherein one of the requests is a request that the server send the responses to the requests using chaining. In response, the server may assemble a first set of responses to client, compress the set, and append a header providing information about the first set of responses (e.g., its size). The server may repeat this process for a number of sets of responses, and then send the headers and responses in one batch to the client. Each header may include a pointer to the next header in the batch, thereby allowing the client to properly decode the responses. The final header in the batch may be configured with a special tag to indicate that it corresponds to the final response.

In some implementations, the client may be configured to communicate the size of its buffer to the server. The server may then use this information to set the size of its own buffer, thereby preventing the responses from overflowing the client's buffer when the client receives them. In addition, the client may be configured to communicate the size of an uncompressed set of responses that it is configured to handle. The server may use this information to create sets of responses that are the correct size, and may or may not compress the sets of responses. The server may chain the sets of responses and may continue to chain sets, compressed or not, until the server's buffer is full or close to full. The chained set of responses may then be sent to the client, which may decompress the sets (if applicable), and may process each of the sets of responses individually.

By compressing multiple sets of responses on the server and sending these in a single batch (i.e., a "chained" or "packed" batch), there is the potential for increased performance in communications between client and server. While prior systems have utilized compression to reduce the total number of bytes sent between client and server, by packing buffers before they are sent, more data can be added to the buffer and sent in each session, thus reducing the total number of roundtrips for high latency networks.

While this technique may have broad applicability, it is especially well suited for operations between email clients and email servers. For example, the method can be used with Microsoft Outlook for Fast Transfer operations such as Copy-Messages. This function copies message headers from a server to the client.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter. The headings included below in the detailed description are for organizational purposes only and are not intended to limit or modify the scope of the invention or the appended claims.

Other advantages will become apparent from the following detailed description when taken in conjunction with the drawings, in which:

BRIEF DESCRIPTION OF THE DRAWINGS

FIG. 6 is a flowchart representing a method for an email server to handle processing of requests in accordance with one embodiment of the present invention;

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details. Furthermore, well-known features may be omitted or simplified in order not to obscure the present invention.

Prior to proceeding with a description of the various embodiments of the invention, a description of the computer and networking environment in which the various embodiments of the invention may be practiced will now be provided. Although it is not required, the present invention may be implemented by programs that are executed by a computer. Generally, such programs include routines, objects, components, data structures and the like that perform particular tasks or implement particular abstract data types. The term "program" as used herein may connote a single program module or multiple program modules acting in concert. The term "computer" as used herein includes any device that electronically executes one or more programs, such as personal computers (PCs), hand-held devices, multi-processor systems, microprocessor-based programmable consumer electronics, network PCs, minicomputers, mainframe computers, consumer appliances having a microprocessor or microcontroller, routers, gateways, hubs and the like. The invention may also be employed in distributed computing environments, where tasks are performed by remote processing devices that are linked through a communications network. In a distributed computing environment, programs may be located in both local and remote memory storage devices.

Figure 1:
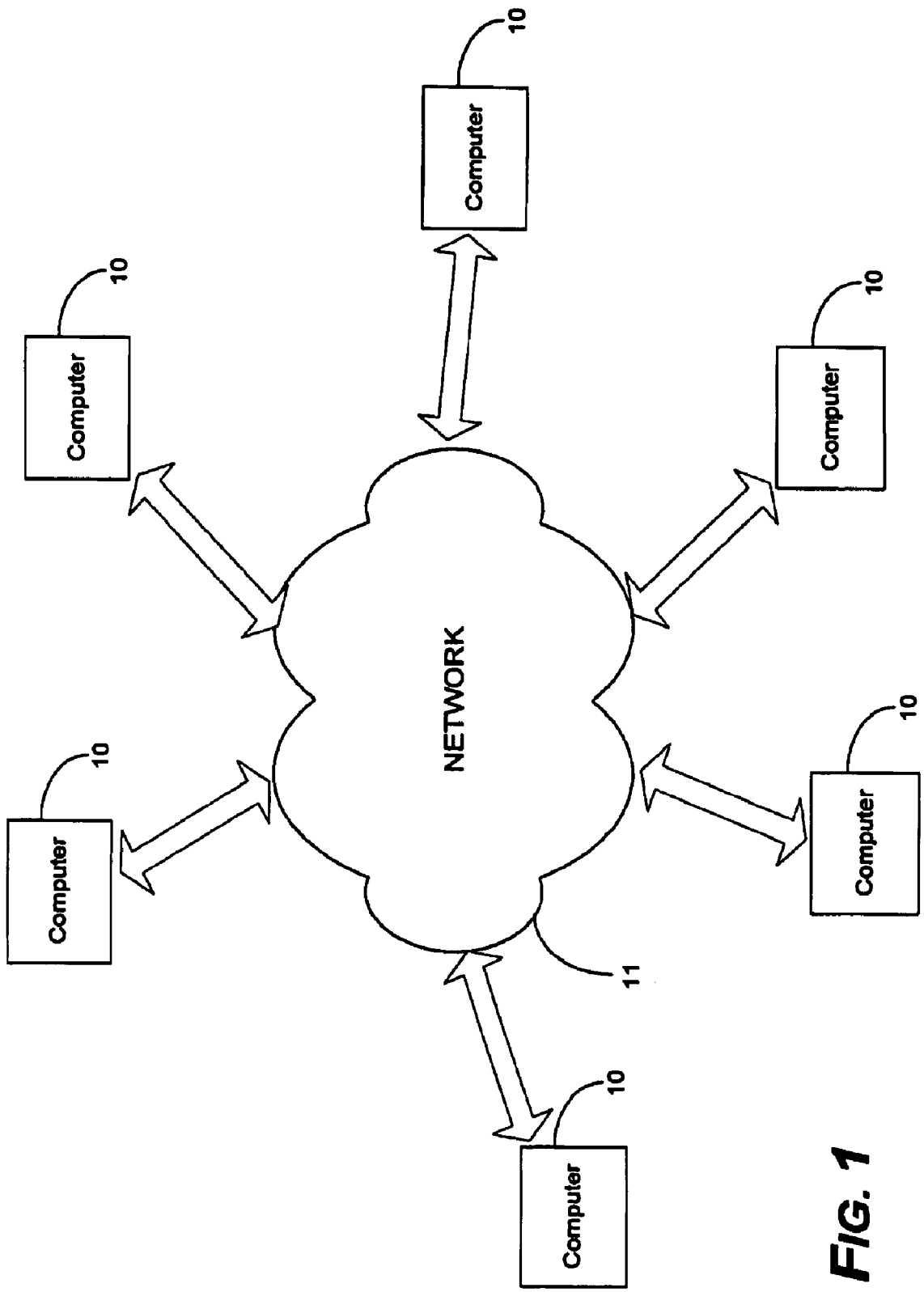
FIG. 1 is a block diagram representing a computer network into which the present invention may be incorporated.

An example of a networked environment in which the invention may be used will now be described with reference to FIG. 1. The example network includes several computers 10 communicating with one another over a network 11, represented by a cloud. The network 11 may include many well-known components, such as routers, gateways, hubs, etc. and allows the computers 10 to communicate via wired and/or wireless media. When interacting with one another over the network 11, one or more of the computers 10 may act as clients, servers or peers with respect to other computers 10. Accordingly, the various embodiments of the invention may be practiced on clients, servers, peers or combinations thereof, even though specific examples contained herein do not refer to all of these types of computers.

Figure 2:
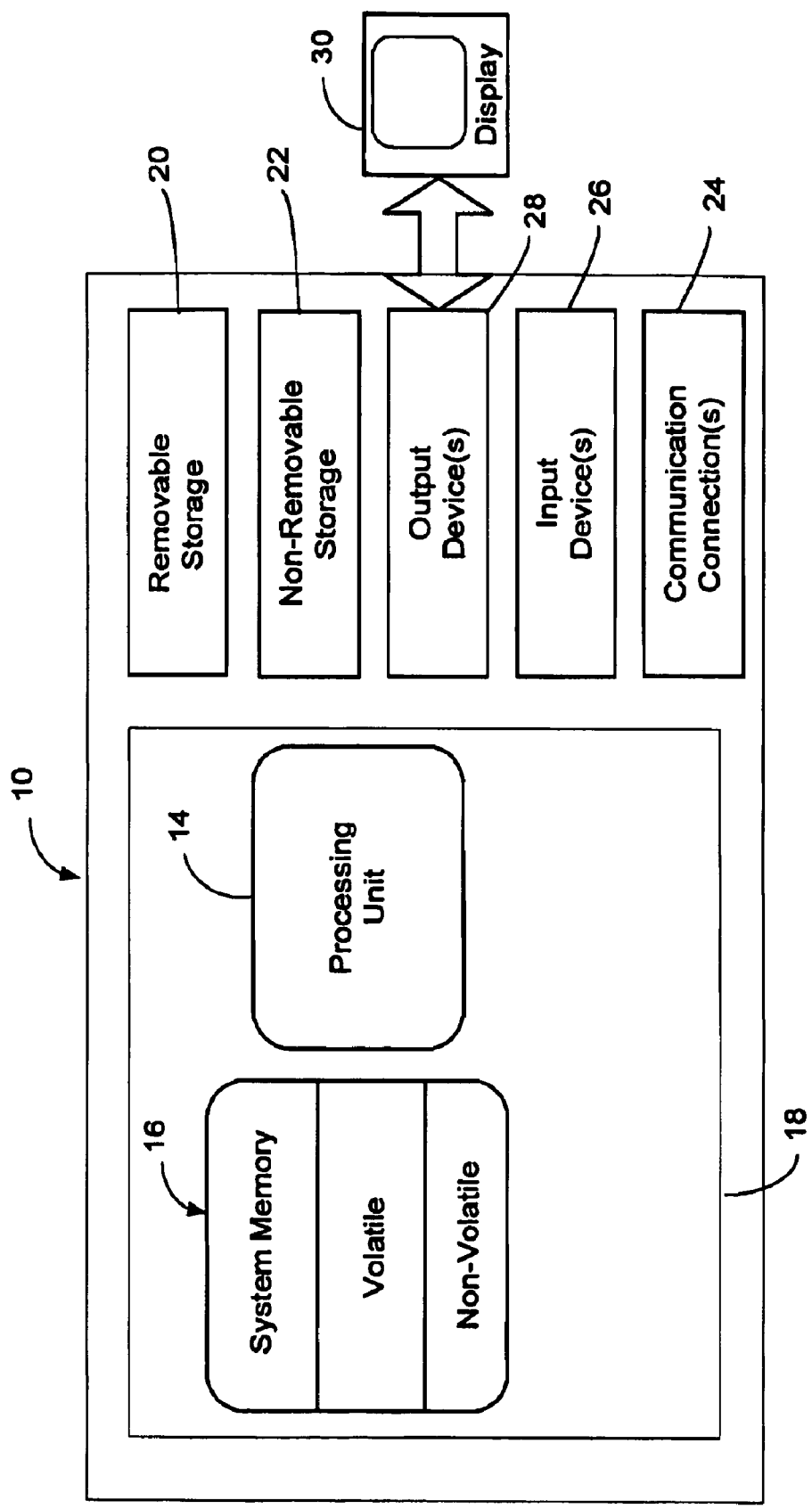
FIG. 2 is a block diagram of an architecture of a computer into which the present invention may be incorporated.

Referring to FIG. 2, an example of a basic configuration for a computer 10 on which all or parts of the invention described herein may be implemented is shown. In its most basic configuration, the computer 10 typically includes at least one processing unit 14 and memory 16. The processing unit 14 executes instructions to carry out tasks in accordance with various embodiments of the invention. In carrying out such tasks, the processing unit 14 may transmit electronic signals to other parts of the computer 10 and to devices outside of the computer 10 to cause some result. Depending on the exact configuration and type of the computer 10, the memory 16 may be volatile (such as RAM), non-volatile (such as ROM or flash memory) or some combination of the two. This most basic configuration is illustrated in FIG. 2 by dashed line 18.

The computer 10 may have additional features and/or functionality. For example, the computer 10 may also include additional storage (removable storage 20 and/or non-removable storage 22) including, but not limited to, magnetic or optical disks or tape. Computer storage media includes volatile and non-volatile, removable and non-removable media implemented in any method or technology for storage of information, including computer-executable instructions, data structures, program modules, or other data. Computer storage media includes, but is not limited to, RAM, ROM, EEPROM, flash memory, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 10. Any such computer storage media may be part of computer 10.

The computer 10 preferably also contains communications connection(s) 24 that allow the device to communicate with other devices. A communication connection (e.g., one of the communication connections 24) is an example of a communication medium. Communication media typically embody computer readable instructions, data structures, program modules or other data in a modulated data signal such as a carrier wave or other transport mechanism and include any information delivery media. By way of example, and not limitation, the term "communication media" includes wired media such as a wired network or direct-wired connection, and wireless media such as acoustic, RF, infrared and other wireless media. The term "computer-readable medium" as used herein includes both computer storage media and communication media.

The computer 10 may also have input devices 26 such as a keyboard, mouse, pen, voice input device, touch input device, etc. Output devices 28 such as a display 30, speakers, a printer, etc. may also be included. All these devices are well known in the art and need not be discussed at length here.

Buffer Packing

Figure 3:
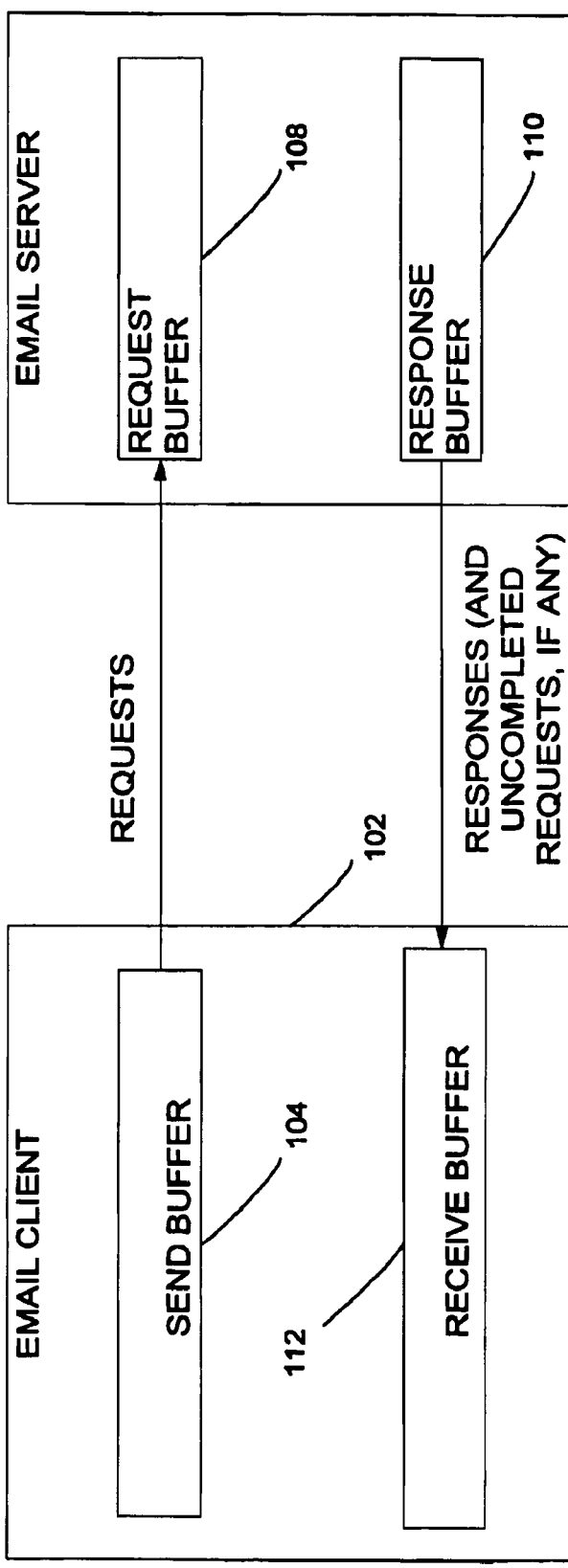
FIG. 3 is a block diagram showing a request and response exchange between an email client and an email server in accordance with the present invention.

Turning now to FIG. 3, one example of an email network 100 in which the present invention may be implemented is shown. The email network 100 of the present invention utilizes request and response exchanges to pass queries and data between client and server components in the email network 100. In practice, the performance of a protocol may be affected by the underlying communications network transport mechanism used to implement communications between clients and servers in an email network, such as the email network 100. For example, in an email network that uses remote procedure calls (RPCS) as the underlying communications network transport mechanism, it may be much more efficient to make a single remote procedure call of larger size (e.g., 32KB) than to make several remote procedure calls of smaller size (e.g., 2KB). One way known to improve performance in such an email network is to buffer multiple requests and/or responses for transmission in a single remote procedure call.

As an example, FIG. 3 shows a request and response exchange between an email client 102 and an email server 106, one or both of which may be configured such as the computer 10. In this example, the email client 102 allocates a send buffer 104 and fills it with requests, which may be one or more sub-requests or remote operations (ROPs), to be sent to the email server 106. When the send buffer 104 is full (or nearly full), the email client 102 sends the contents to the email server 106, which stores them in a request buffer 108. The email server 106 reads requests out of the request buffer 108 and processes the requests. Processing each request produces a result in the form of a response. These responses may include data requested by the email client 102 (e.g., a particular email message). The email server 106 stores these responses into a response buffer 110.

In accordance with one embodiment of the present invention, as the email server 106 processes each request, it uses a pointer to track which request is the next request to be processed from the request buffer 108. When the email server 106 determines that the response buffer 110 is full (e.g., has less than 8BK remaining out of 32KB), then the email server 106 stops processing the requests in the request buffer 108. Any remaining requests that have not been processed (i.e., uncompleted requests) are appended to the contents of the response buffer 110. These uncompleted requests and the responses to the completed requests are sent to a receive buffer 112 at the email client 102.

In one embodiment of the present invention, the email client 102 is capable of designating the size of any of the buffers 104, 108, 110, 112. The size of a response is typically larger than the size of a request. For this reason, the size of the response buffer 110 and the receive buffer 112 (collectively, the "response buffers 110 and 112") may be designated by the email client 102 to be larger than the size of the send buffer 104 and the request buffer 108 (collectively, the "request buffers 104 and 108").

Prior art email network systems of which the inventors are aware were not capable of this function, because they used only a single buffer at the email client and the email server. Although the background section of the provisional application upon which this specification claims benefit depicts an email network in which the email client and email server each have two buffers, applicants are unaware of any email networks prior to the present invention that utilized more than a single buffer at each.

Some email networks that utilize buffers, for example the email network 100 shown in FIG. 3, may employ a fast transfer mode between a client (e.g., the email client 102) and a server (e.g., the email server 106). Fast transfer mode includes requests, such as ROPs, by a client that are divided into at least two categories: requests that result in an initialization of a fast transfer data source at the server, and requests that result in the efficient transfer of data from the fast transfer data source to the client. The fast transfer data source may be, for example, a database table. The fast transfer data source serves as a ready temporary store of data that enables later requests for the data to be serviced with less delay than would otherwise be possible. Sometimes the second category of fast transfer mode request seeks to achieve efficient transfer of data by explicitly specifying the size of the response. As an example, the size of the response may be set to the size of the entire receive buffer 112, minus response overhead.

Figure 4A:
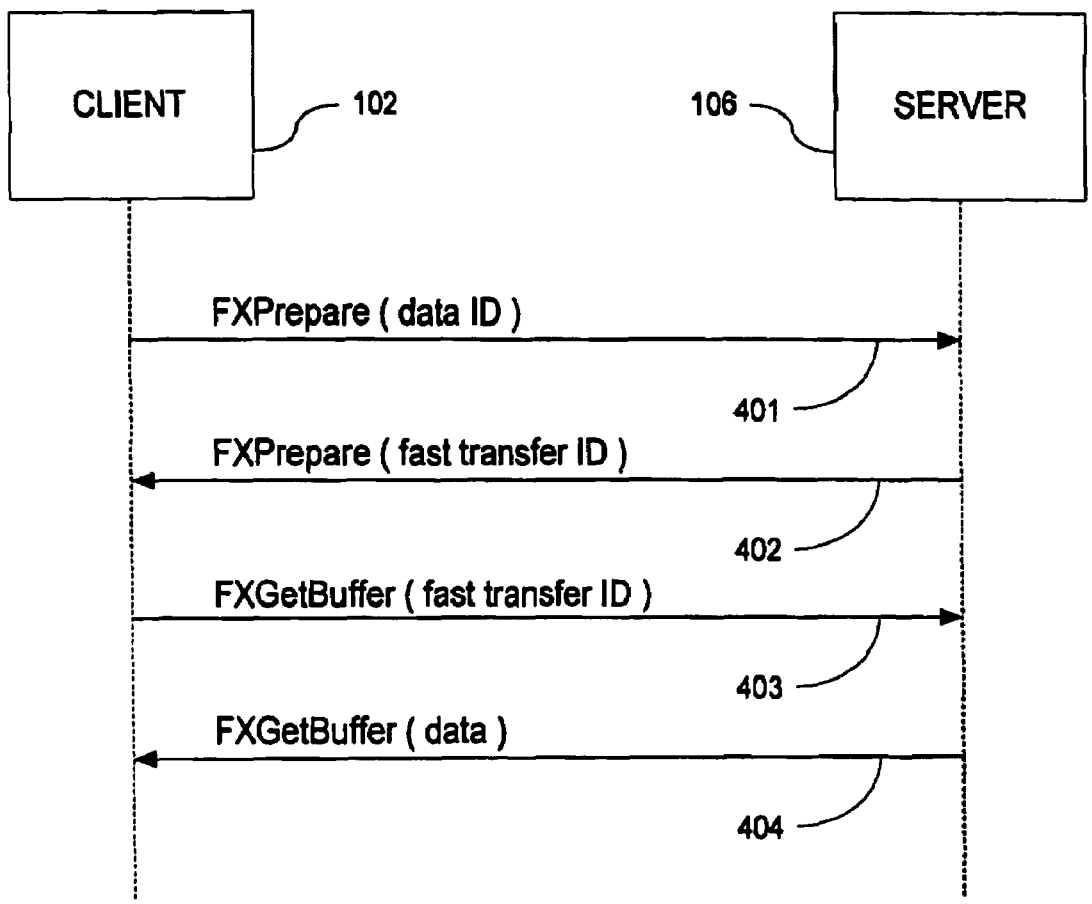
FIG. 4A is a representation of a two-step fast transfer mode process in accordance with one aspect of the present invention.

FIG. 4A shows a fast transfer operation having at least two request-response cycles. In a first request 401 a ROP (e.g., FXPrepare) initializes a fast transfer data source on email server 106. At the email server 106, only FXPrepare is processed (i.e., the fast transfer data source is initialized) and its result is returned in a first response 402. In a second request 403 a ROP (e.g., FXGetBuffer) requests the email server 106 to fill the response buffer 110 from the fast data source. The email server 106 empties the fast data source into the response buffer 110, and returns the result in a second response 404. If the response buffer 110 for the email server 106 fills before the fast data source is emptied, additional FXGetBuffer ROPs may be required.

Figure 4B:
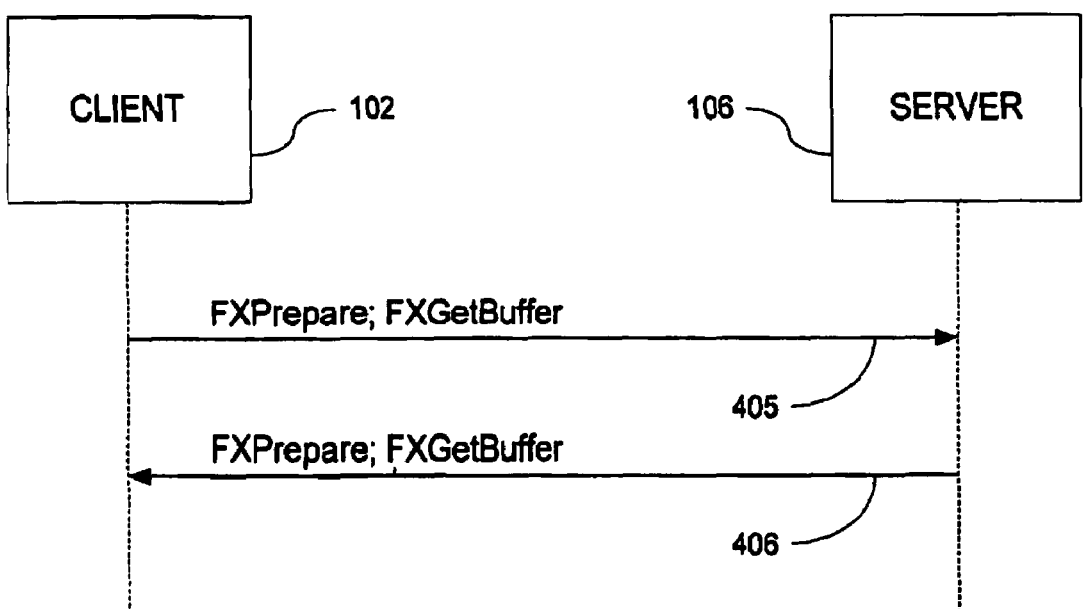
FIG. 4B is a representation of a one-step fast transfer mode process in accordance with one aspect of the present invention.

FIG. 4B shows a fast transfer operation having only a single request-response cycle. In a first request 405, both FXPrepare and FXGetBuffer are processed by the email server 106 and the results of both operations are returned in a first response 406. The result of FXPrepare is available to FXGetBuffer at email server 106 because part of each buffer is explicitly defined as a shared data table.

It is desirable to reduce the number of request-response cycles because such a reduction results in a more efficient transfer of data. A fast transfer operation having more than only a single request-response cycle may occur when response buffer 110 is too full to hold the result of an FXGet-Buffer ROP.

Figure 5:
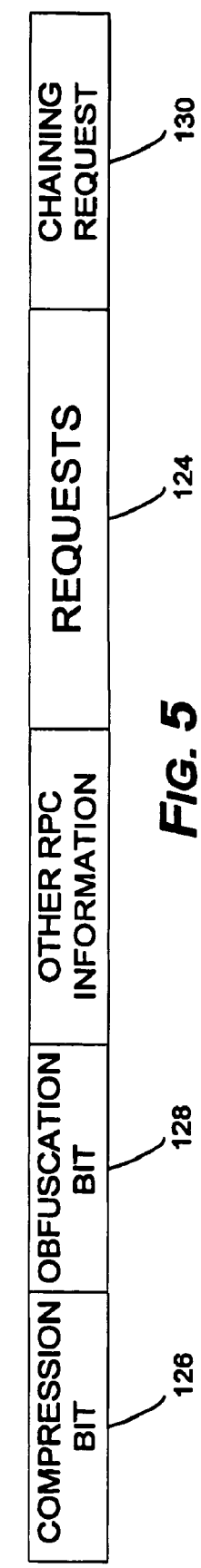
FIG. 5 is a block diagram representing a request in accordance with one embodiment of the present invention.

Turning now to FIG. 5, one example of contents 120 of the client's send buffer 104 is shown. In this example, the send buffer 104 contains a remote procedure call (RPC) header 122, and a number of requests 124.

In accordance with one aspect of the present invention, the RPC header 122 may include a compression bit 126 and an obfuscation bit 128. The compression bit 126 indicates whether or not the email server 106 is to compress the responses to the requests. Other information may be provided within the contents 120 to indicate that the email server 106 is to compress the responses. Compression may not always be desired. For example, if the client has a high speed connection with low latency and does not have sufficient reserve processing power to efficiently perform decompression, the client may send the request with an indication that compression is not desired. Alternatively, if the client has sufficient processing power and the connection to the server is low bandwidth, the client may indicate to the server that it desires compression (e.g., set the compression indicator bit in the header).

The obfuscation bit 128 indicates whether or not the email server 106 is to obfuscate the requests. Obfuscation is a simple operation performed to prevent data from being sent as clearly readable text over a network. One example of obfuscation is to XOR (a known obfuscation method) the requests before they are sent. In some embodiments, encryption may be used in lieu of obfuscation. Again, other information may be included within the contents 120 that indicates that the requests are to be obfuscated or encrypted.

As shown in FIG. 5, in some embodiments the email client 102 may be configured to include a special request 130 within the contents 120 that instructs the email server 106 to respond to the client's request using chaining, described below.

Turning now to FIG. 6, a flowchart is provided illustrating a method for transferring data between a client and server in accordance with one embodiment of the present invention. Beginning at step 600, the email server 106 receives a plurality of requests from a client (for example, the requests 124).

In accordance with one embodiment of the present invention, the email client 102 may request chaining or non-chaining for the email server 106 to send responses. At step 602, the email server 106 examines the requests 124 to determine whether the requests include a request for chaining (e.g., the special request 130). If not, then step 602 branches to step 604, where the email server 106 begins building responses for the requests 124. One example of a process for building a response using non-chaining is shown in FIG. 8, and the steps in FIG. 7 will be applied to that example in this description.

At step 604 (FIG. 6), the email server 106 creates a header 140. At step 606, responses 142 (FIG. 6) to the requests 124 are retrieved and are stored in the response buffer 110. Once the email server 106 has generated enough responses so that the responses 142 and the header 140 fill or almost fill the response buffer 110, the email server 106 stops processing requests. Whether the response buffer 110 is full or almost full may be defined by the email server 106 and/or the email client 102. As an example, the response buffer 110 may be considered full when it has less than 8k remaining of an initial 32k buffer.

If the email client 102 indicated that it supports compression (e.g., by properly setting the compression bit 126), the email server 106 compresses the responses within the response buffer 110 into a compressed set 144 of responses 142 (FIG. 7) at step 608. Similarly, also at step 608, if the email client 102 indicated that it supports obfuscation (e.g., by properly setting the obfuscation bit 128), then the email server 106 may obfuscate or encrypt the responses 142 as instructed.

Any requests that have not been processed are appended to the responses in the request buffer 108 at step 610. These unprocessed responses may be placed in the unused memory after compression, shown generally at memory 146 in FIG. 6. The email server 106 then sends the responses and the uncompleted requests to the email client 102 at step 612.

As can be seen by the example described above and shown in FIG. 7, the unused memory after compression (i.e., the memory 146) in a non-chaining response may be substantial. In accordance with one aspect of the present invention, the amount of unused memory may be minimized using a chaining process. However, the non-chaining method thus far described may be useful, for example, where an email client 102 does not want chaining, for example in a ROP that does not request fast transfer mode.

Figure 7:
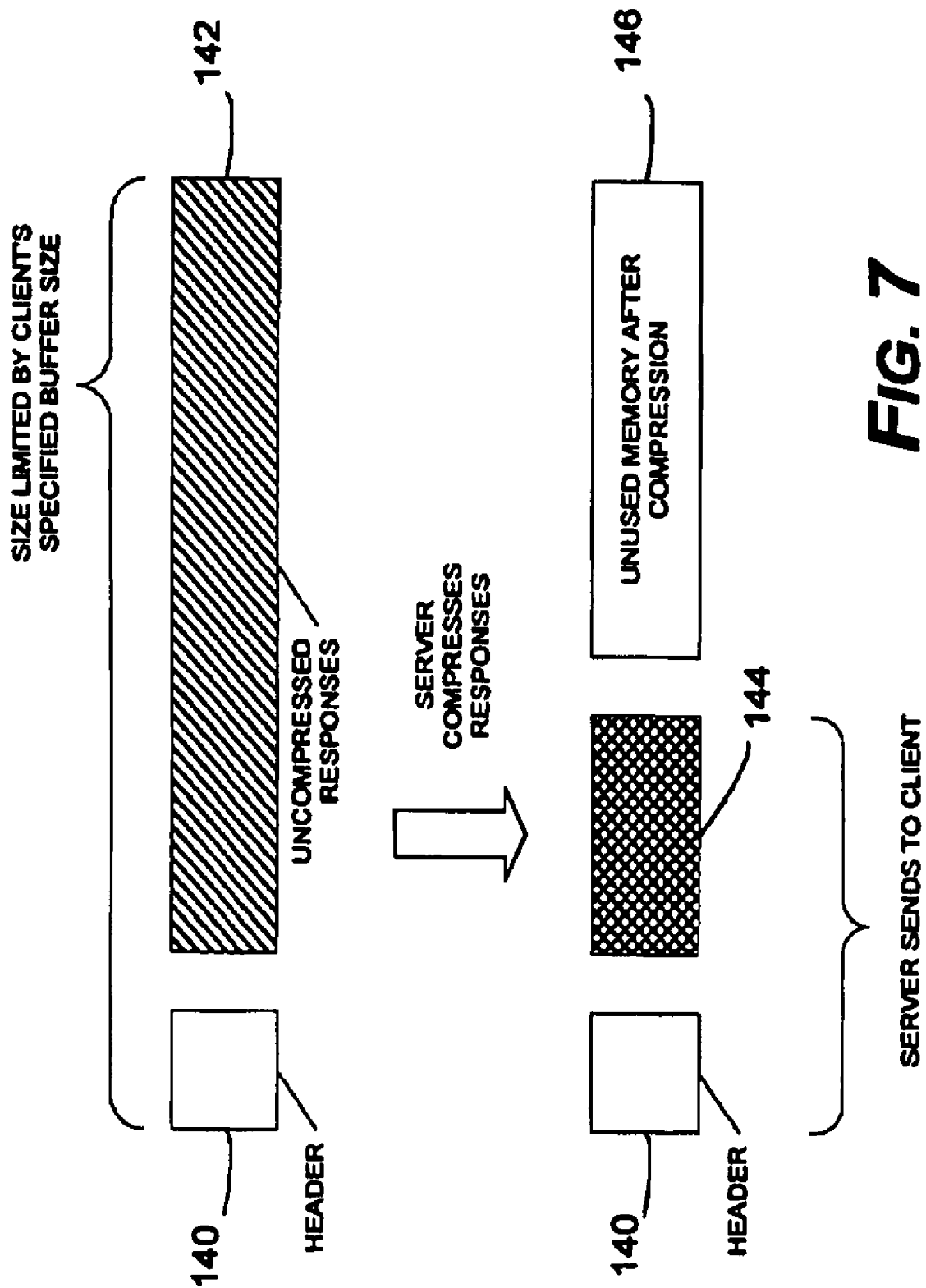
FIG. 7 is a representation of compressions by an email server in accordance with one embodiment of the present invention.
Figure 8:
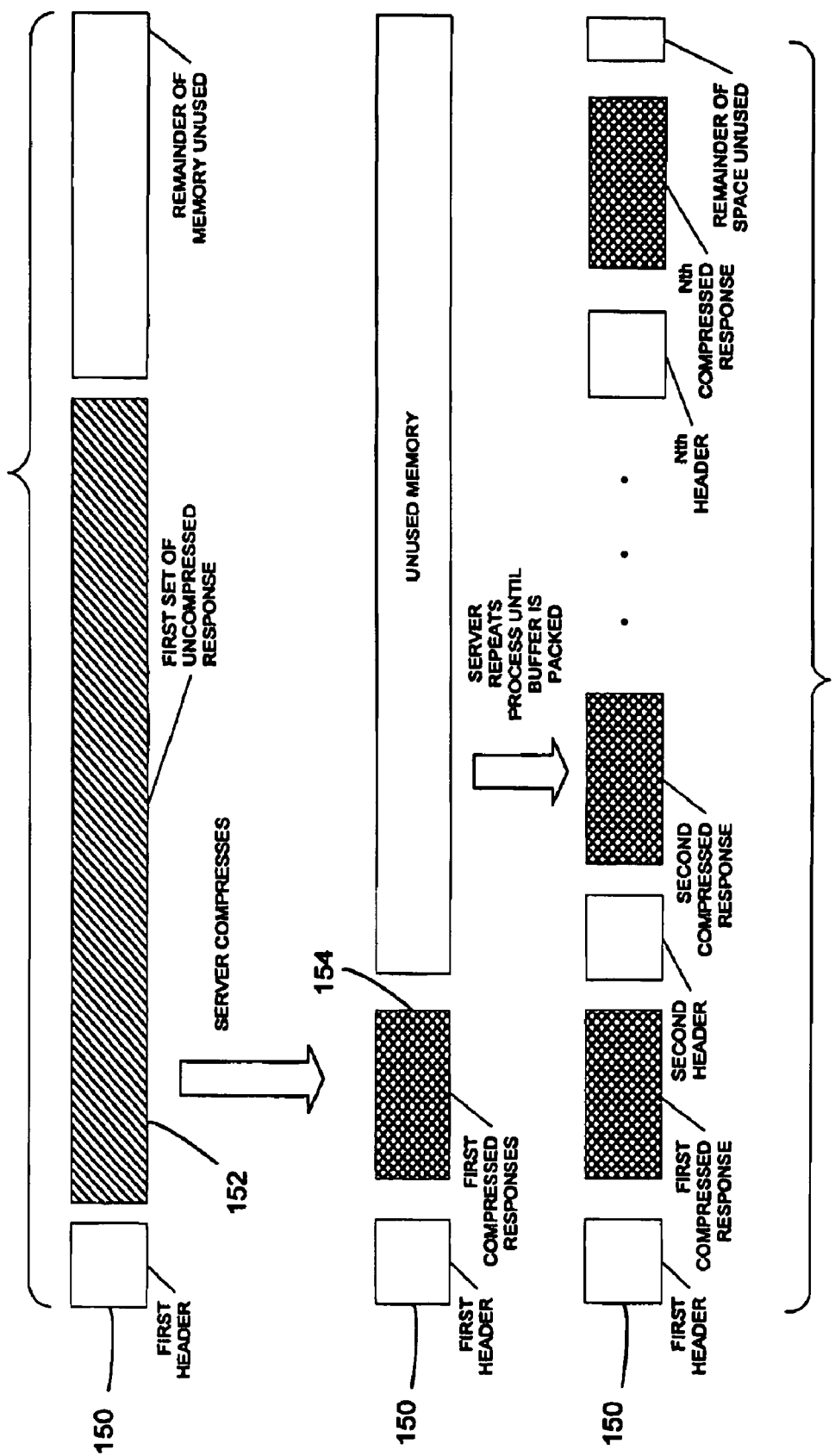
FIG. 8 is a representation of compressing and chaining responses by an email server in accordance with one embodiment of the present invention.

If the email client 102 indicates that the email server 106 should use chaining, then step 602 branches to step 614, where the email server 106 creates a first header 150 (FIG. 7). FIG. 8 shows an example of a process for building a response for chaining, and is used with the description of steps 614 to 620.

At step 616, the email server 106 retrieves and fills the response buffer 110 with responses 152. Again, the response buffer 110 may be considered full once it reaches a predefined limit. It may take only one response to fill the response buffer 110, however, as used herein, a "set of responses" means one or more responses. At step 618, once the response buffer 110 is full or almost full, the email server 106 compresses and/or obfuscates the responses within the response buffer 110 in accordance with the instructions from the email client 102 (e.g., per the compression bit 126 and/or obfuscation bit 128). A compressed set 154 of responses is created, leaving a large section 156 of unused memory in the request buffer 108.

After compression and/or obfuscation, at step 620 a determination is made whether additional responses can fit within the response buffer 110. Again, whether additional responses can fit may be defined by the email client 102 or the email server 106. However, after the first compression, it is anticipated that additional space will be available. If additional space is available, then the process loops back to step 614, where the email server 106 creates and appends a second header 158 (FIG. 8) and begins processing requests once again (step 616).

Once the response buffer 110 is full or almost full with responses, the email server 106 compresses and/or obfuscates the newly added responses 160 at step 618. A determination is again made at step 620 as to whether there is room left for further responses. If so, the process once again loops back to step 614, where a third header is appended, and the email server 106 once again fills the response buffer 110 with responses and compresses and/or obfuscates the responses (steps 616 and 618). This process is repeated until all requests have been completed or the response buffer 110 is full or almost full of headers and corresponding compressed responses. Once the response buffer 110 is full or almost full of compressed responses and headers (shown at the bottom of FIG. 8), step 620 branches to step 610, where the email server 106 appends any uncompleted requests (if any) and sends the contents of the response buffer 110 to the email client 102.

An email client 102 that receives the contents of the response buffer 110 in its receive buffer 112 may then process each of the sets of responses between the headers. If the response sets are compressed and/or obfuscated, then the email client 102 may decompress or reverse the obfuscation. In such a case, the email client 102 still has a plurality of response sets that it may then process.

As can be seen by the differences between the data sent in the non-chaining process in FIG. 7 and the chaining process of FIG. 8, chaining permits a multiple header/response pairs to be chained or packed together and to be sent in one "batch", thereby potentially reducing the number of round trips between the email client 102 and email server 106. This process is referred to herein as "chaining" or "packing" of the responses. Chaining may be far more efficient for a network, especially in a low bandwidth environment. In accordance with one embodiment of the invention, the email server 106 may provide chaining with fast transfer mode requests, and may not provide chaining with a request that is not fast transfer mode.

Figure 9:
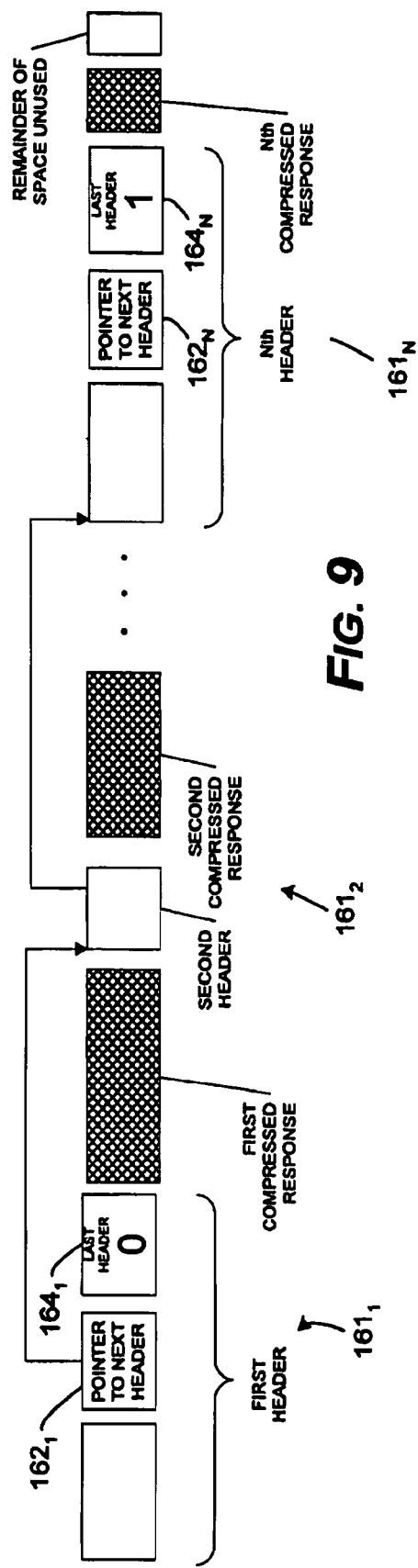
FIG. 9 is a representation of contents of a response buffer of an email server in accordance with one embodiment of the present invention.

Turning now to FIG. 9, a more detailed example of a response buffer 159 is shown. In this example, each header $161_1$, $161_2$ ... $161_N$ includes a pointer $162_1$ ... $162_N$ to the next header in the buffer. Alternatively, the header 161 may include the compressed size of the corresponding response. In either event, this feature permits the email client 102 to more easily decode the compressed batch when received, because the email client 102 will know the size of each response and the location of the beginning of the next response.

Each header 161 may also include information $164_1$ ... $164_N$, for example in the form of a bit file, that indicates whether the header 161 corresponds to the last response in the buffer. The header 161 may also include other information, such as the uncompressed size of the corresponding response information.

Note that the email server 106 may receive and process requests from multiple email clients 102 in parallel. To that end, a single email client 102 is shown merely to simplify the figures and accompanying explanation.

Using Larger Response Buffers

As described above, the email client 102 may be configured to inform the email server 106 what size of request and/or response buffers will be used. For example, in one embodiment of the present invention, the request buffers 104 and 108 are 32KB each, and the optimal size of the response buffers 110 and 112 is 96KB each, a ratio of 3 to 1.

Although the email client 102 may specify larger response buffers 110 and 112, the email client 102 may be configured to work with data chunks of responses that are smaller than the actual size of the response buffers 110 and 112. For example, 96K buffers may be specified for the response buffers 110 and 112, but the email client 102 may desire that all data chunks of responses be 32K or less. The packing or chaining of the present invention allows such a system to be operative.

Figure 10:
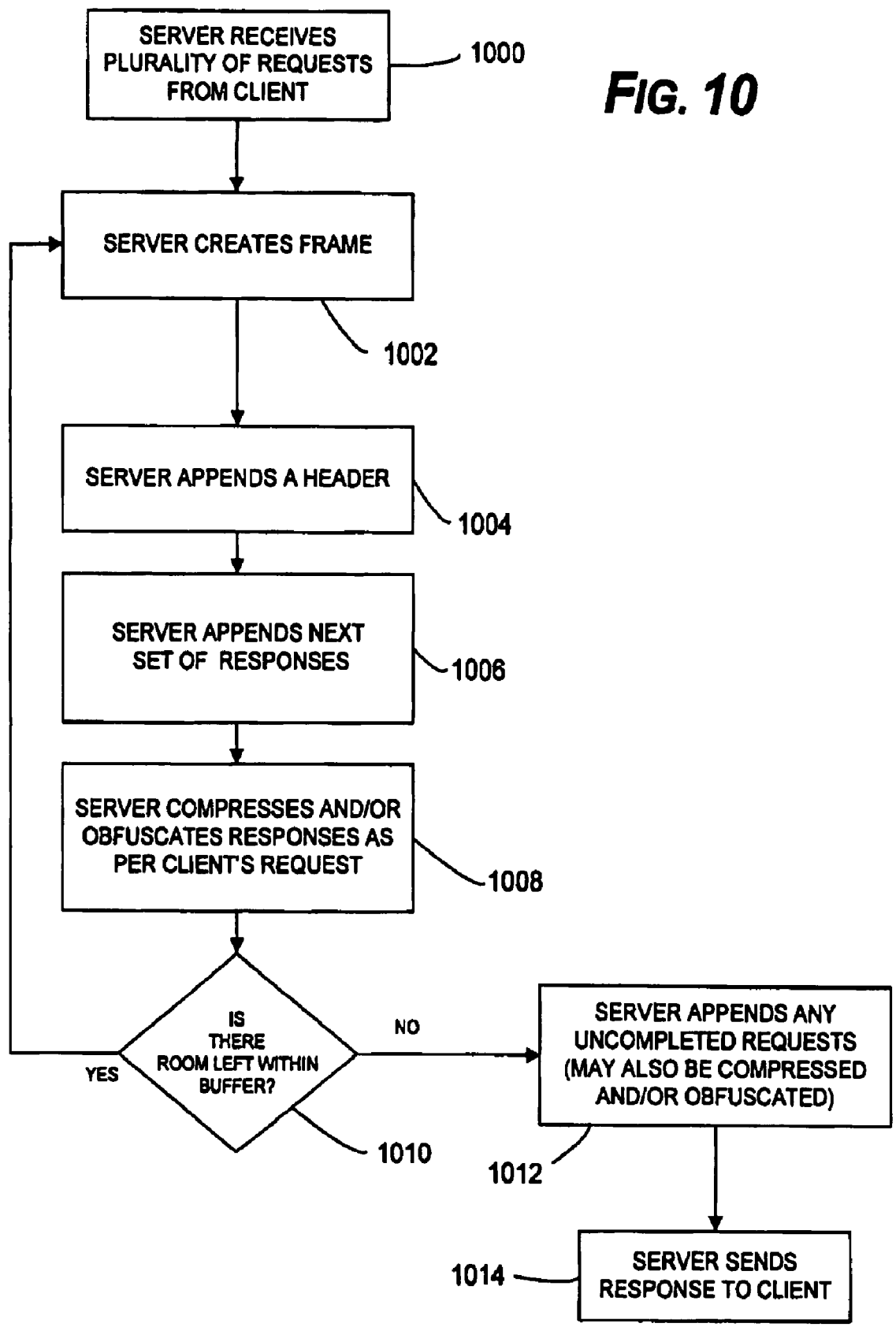
FIG. 10 is a flowchart generally representing steps performed by an email server to provide frames of responses to an email client within a buffer that is larger than the frames in accordance with one embodiment of the present invention.

An embodiment of a method for allowing this function is shown in the flowchart in FIG. 10. Beginning at step 1000, the email client 102 sends a set of requests to the email server 106, along with information defining a response buffer size (e.g., 96K), and information about the size of a data chunk that the client is configured to process. At step 1002, the email server 106 creates a frame within the response buffer 110 equal to the size of the data chunk defined by the client. The email server 106 then writes, at step 1004, a header into the frame in the response buffer 110. At step 1006, the email server 106 begins processing the responses until it fills or closely fills the frame. The set of responses may or may not be compressed or obfuscated in step 1008.

A determination is then made at step 1010 whether the response buffer 110 is full or not. Typically, the response buffer 110 will not be full after the first processing of responses. If the response buffer 110 is not filled, the process loops back to step 1002, where the email server 106 creates a new frame beginning at the end of the just-processed set of responses. A pointer may be used so that the email server 106 knows where to start this next frame. The new frame will also be the size of a data chunk that the email client 102 can handle, if there is enough room within the response buffer 110. At step 1004, the email server 106 writes the next header in the new frame. The process then proceeds to step 1010.

Once the response buffer 110 is filled (or all requests have been processed, whichever comes first), the process branches to step 1012, where the email server 106 copies the remaining unprocessed requests in the response buffer 110. At step 1014, the email server 106 sends the contents of the response buffer 110 to the email client 102.

An email client 102 that receives the contents of the response buffer 110 in its receive buffer 112 may then process each of the chunks of data (set of responses) between the headers. If the responses are not compressed or obfuscated, then the email client 102 may process each of the response sets between the headers as is. The response sets will be equal to or smaller than the data chunks defined by the email client 102, so the email client 102 should be able to properly handle the data sets. If the response sets are compressed and/or obfuscated, then the email client 102 may decompress or reverse the obfuscation. In such a case, the email client 102 still has a plurality of response sets that are each smaller than or equal to the size of data chunks it can handle.

Tricking the Server into Processing More Requests

When the email server 106 has completed processing a set of requests, the email server 106 may have to be "tricked" into continuing to process additional requests. For example, existing email servers are typically configured to process requests and provide responses to a certain size (e.g., 32KB), the size usually being dictated by the email client 102. After this processing, existing email servers are is configured to either send a response indicating the responses are ready (a FXPrepare response), or to automatically send the responses (a FXGetBuffer response). However, using the compression disclosed herein, it may be desirable for the email server 106 to process even more requests on a FXGetBuffer response so as to fill additional space within the response buffer 110. The additional space may created by compression. Alternatively, the large buffer embodiment described above may have additional space after processing one of its frames.

Figure 11:
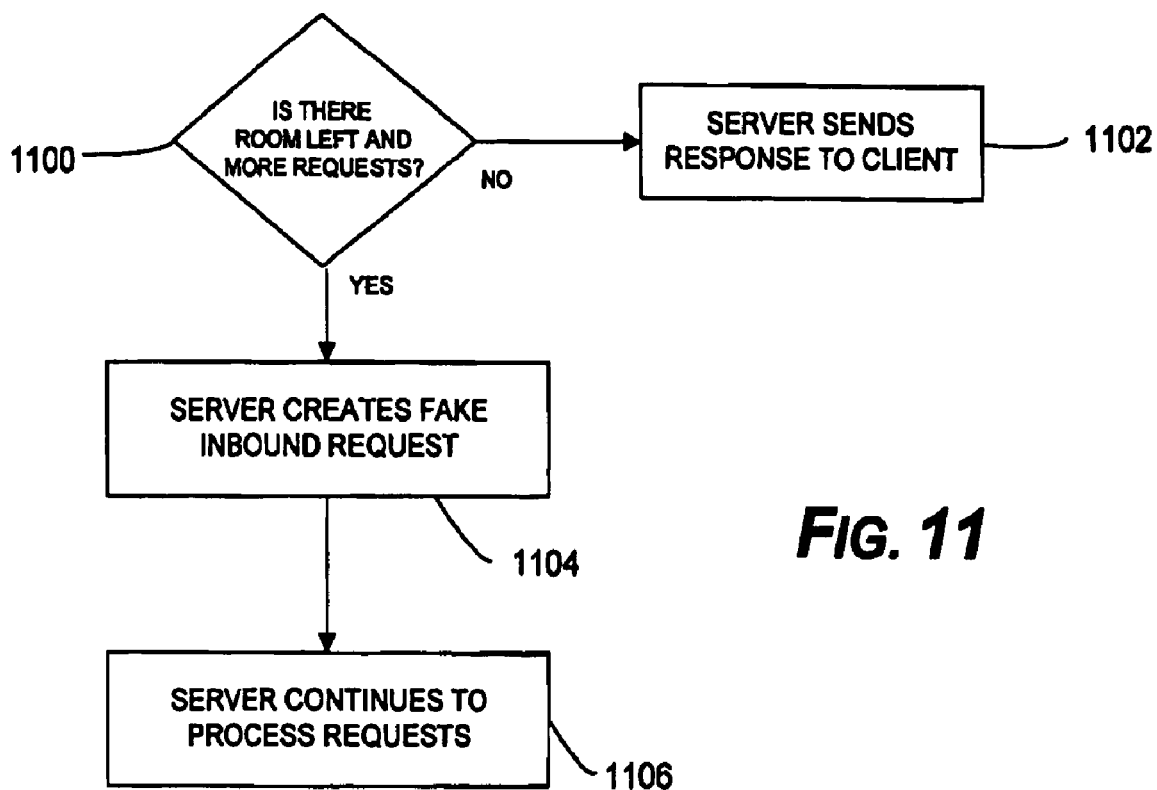
FIG. 11 is a flowchart generally representing steps for tricking a server into adding additional responses to a response buffer in accordance with one embodiment of the present invention.

An embodiment of a method for handling this situation is shown in FIG. 11. Beginning at step 1100, a determination is made if there is room for more responses and if there are more requests to process. If not, then step 1100 branches to step 1102, where the email server 106 sends the responses to the email client 102. If the status of the email server 106 after providing a set of responses indicates that there is more to process and room to process them, then step 1100 branches to step 1104, where the email server 106 generates a "fake" inbound request (e.g., a fake FXGetBuffer request). This pseudo RPC (remote procedure call) inbound request is then processed by the email server 106 as if it had been received from the email client 102. The RPC is "pseudo" in that it is not actually sent from a remote computer, but instead is sent from within the server. The outbound buffer for this pseudo RPC is set to be the remaining portion of the original outbound buffer after compression (which may be limited by the frames defined above). The email server 106 then processes the new responses in step 1106, as described above.

The email server 106 continues repeating this process until it hits one of the following criteria: there is nothing left on the inbound request to process, the remaining outbound buffer size is less than a predetermined threshold (e.g. 8KB), a maximum number of buffers are chained (e.g., 64), or there is a hard error.

Each packed set of responses has its own header with its own flags. One packet could be compressed and the next obfuscated, or, alternatively, neither packet may be compressed or obfuscated. For each new buffer in the chained response, the flags are honored.

Example of Contents of a Buffer

Below is a detailed view of one example with two chained buffers in the outbound response buffer:

does not support one or both of these, the email server 106 may ignore the corresponding flag(s).

As described above, two new registry keys may be added on the email client 102 to toggle whether the email client 102 should or should not use chained responses, and what the outbound buffer size should be (e.g., 32k<=size<=128k). This could also be used for requesting compression. These features could be enabled by default, or disabled by default depending on the implementation.

In some implementations, the inbound buffers going to the email server 106 may be packed. These implementations may implement a similar process on the email client 102 to handle packing as described above for the email server 106. However, since the downloading of items is typically more time consuming than uploading, some implementations may send inbound buffers to the email server 106 without packing.

While this disclosure has focused on email client and server implementations, the systems and methods disclosed herein may also be applicable to other types of applications. For example, the techniques disclosed herein may be applied to synchronizing information between a mapping client and a server in a mapping application such as Microsoft's Map-

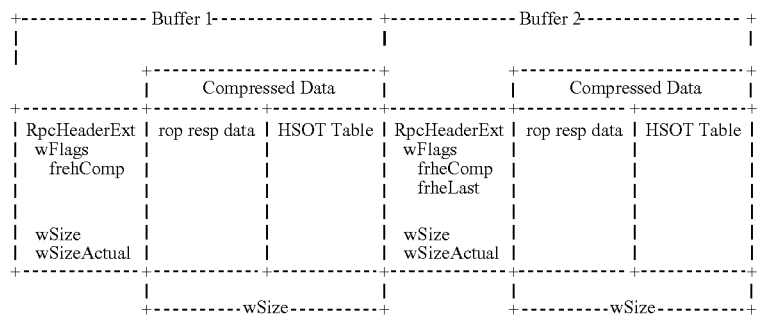

As illustrated above, each response packed buffer has its own HSOT (Handle to Store Operation Table) table. A HSOT is an identifier in each network request of what object on the email server 106 it is acting on. This is a table of HSOT's, the entries of which correspond to internal store objects. Each operation in the request buffer 108 contains an index into this table to identify which store object the operation applies to. The email server 106 will also add entries to this table if a new internal store object is created during an operation. The HSOT table should not differ in value from the first one in the list, but will only contain the HSOT entries for all HSOT's up to and including the one used in the FXGetBuffer ROP, described above. This is primarily an implementation decision as it will reduce the complexity on the email server 106. The HSOT table is generally not more than a couple of DWORDs, so this should not consume significant bandwidth.

Note that this is merely one example, and details of different implementations will vary. For example, some of the flags may be interpreted differently based on which features the email client 102 and/or email server 106 support. For example, if the email client 102 indicates that it supports packed and/or compressed buffers, but the email server 106

Point. Furthermore, while the embodiments of the systems and methods have been described in terms of software applications, those skilled in the art will appreciate that the systems may be implemented in hardware, software, or a combination of hardware and software. While the examples have focused on dial up connections, other types of network connections are also contemplated (for example, without limitation, LAN, wireless, ISDN and DSL).

It can thus be seen that a new and useful system and method for communicating between client and server applications using buffer packing has been provided. In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that the elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

What is claimed is:

1. A computer-readable storage medium having stored thereon a data structure specified by a client, said data structure comprising:
   a plurality of requests for operations;
   an indication from the client of a size of a frame within a buffer at a server, said size of a frame defining sets of responses to the requests that the client is configured to process, said frame size being less than the size of the buffer;
   an indication by the client that the sets of responses to the requests should be compressed; and
   an indication by the client that the sets of responses to the requests should be returned to the client via chaining, wherein said chaining comprises:
      a) assembling a first set of responses;
      b) appending a header to the first set of responses; and
      c) repeating a) and b) for one or more additional sets of responses.

2. The data structure of claim 1 further comprising an indication by the client that the sets of responses should be obfuscated.

3. The data structure of claim 1 further comprising an indication by the client that the sets of responses should be encrypted.

4. The data structure of claim 1 wherein the server is an email server and the client is an email client.

5. A method for transferring data between a server and a client, the method comprising:
   a) receiving a plurality of requests from a client, including a request for a chaining of responses to the requests and a request for compressing said responses;
   b) assembling a first set of responses to the client as a function of a pre-defined buffer frame size, said buffer frame size related to a size of a set of responses that the client is configured to process, and said buffer frame size being less than the size of the buffer;
   c) compressing the first set of responses;
   d) appending a header to the first set of responses;
   e) repeating (b) through (d) for one or more additional sets of responses; and
   f) sending the compressed sets of responses and headers together to the client.

6. The method of claim 5, further comprising, prior to step e), generating an inbound request for processing of requests.

7. The method of claim 6, wherein the inbound request is a pseudo remote procedure call.

8. The method of claim 5 wherein receiving a plurality of requests from a client includes a request for obfuscating responses to said requests.

9. The method of claim 5 wherein receiving a plurality of requests from a client includes a request for encrypting responses to said requests.

10. The method of claim 5 wherein the server is an email server and the client is an email client.

11. A computer-readable medium having a tangible component with computer-executable instructions for performing the method recited in claim 5.

12. A method for transferring data between a server and a client, the method comprising:
   a) receiving by the server and from the client, a plurality of stored requests along with a header and a chaining request, said header indicating whether or not the server is to compress responses to the plurality of requests and whether the server is to obfuscate the responses to the plurality of requests, said chaining request indicating whether or not the server is to chain the responses to the plurality of requests;
   b) storing said plurality of requests in a request buffer associated with the server;
   c) generating responses to the requests;
   d) storing said generated responses in a response buffer associated with the server;
   e) compressing a first set of responses being stored in the response buffer based on the received header;
   f) obfuscating the first set of responses based on the received header;
   g) appending a response header to the first set of responses;
   h) repeating (c) through (g) for one or more additional sets of responses; and
   i) sending the compressed and encrypted sets of responses and response headers together to the client as a function of the chaining request wherein said client stores the sent compressed and encrypted sets of responses and response headers in a receive buffer.

13. The method of claim 12, further comprising, prior to step h) of repeating, generating an inbound request for processing of requests.

14. The method of claim 13, wherein the inbound request is a pseudo remote procedure call.

15. The method of claim 12 wherein the server is an email server and the client is an email client and the requests include requests for particular email messages and the set of responses include the requested particular email messages.

16. The method of claim 12 further comprising, prior to step e) of compressing, assembling a first set of responses to the client as a function of a pre-defined buffer frame size, said frame size being related to a size of the response buffer and the receive buffer, and said frame size being less than a size of the send buffer and the request buffer.

17. The method of claim 16 further comprising receiving the pre-defined buffer frame size from the client.

18. The method of claim 12 further comprising storing by the client requests generated by the client in a send buffer associated with the client, and sending by the client to the server the plurality of stored requests along with the header and the chaining request, said header indicating whether or not the server is to compress responses to the plurality of requests and whether the server is to obfuscate the responses to the plurality of requests, said chaining request indicating whether or not the server is to chain the responses to the plurality of requests.

19. The method of claim 18, wherein sending by the client comprises obfuscating the plurality of stored requests and sending said obfuscated plurality requests along with the header and the chaining request to the server, said header indicating that the plurality of requests are obfuscated and said header indicating whether or not the server is to compress responses to the plurality of requests and whether the server is to obfuscate the responses to the plurality of requests, said chaining request indicating whether or not the server is to chain the responses to the plurality of requests.

* * * * *